(12) United States Patent
Wang

(10) Patent No.: US 12,268,185 B1
(45) Date of Patent: Apr. 8, 2025

(54) SEMI-AUTOMATIC FECES SHOVELING CAT LITTER BOX

(71) Applicant: Shenzhen Wenruichenhai Electronic Technology Co., Ltd., Shenzhen (CN)

(72) Inventor: Yiqiang Wang, Rui'an (CN)

(73) Assignee: Shenzhen Wenruichenhai Electronic Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/895,895

(22) Filed: Sep. 25, 2024

(30) Foreign Application Priority Data

Sep. 13, 2024 (CN) .......................... 202422260822.5

(51) Int. Cl.
*A01K 1/01* (2006.01)

(52) U.S. Cl.
CPC .................................. *A01K 1/0114* (2013.01)

(58) Field of Classification Search
CPC .... A01K 1/0114; A01K 1/011; A01K 1/0128; A01K 1/0132
See application file for complete search history.

(56) References Cited

U.S. PATENT DOCUMENTS

| | | | | |
|---|---|---|---|---|
| 5,048,465 A * | 9/1991 | Carlisi | ................... | A01K 1/011 119/161 |
| 5,226,388 A * | 7/1993 | McDaniel | ............ | A01K 1/0114 119/166 |
| 6,082,302 A * | 7/2000 | Thaler | .................. | A01K 1/0114 119/161 |
| 6,202,595 B1 * | 3/2001 | Atcravi | ................ | A01K 1/0114 119/165 |
| 7,051,678 B2 * | 5/2006 | Strickland | ............ | A01K 1/0114 119/165 |
| 7,762,213 B2 * | 7/2010 | Cook | ................... | A01K 1/0114 119/161 |
| 8,109,237 B1 * | 2/2012 | Tsengas | ............... | A01K 1/0114 119/616 |
| 11,000,007 B2 * | 5/2021 | Ward | ................... | A01K 1/0107 |
| 11,457,604 B1 * | 10/2022 | Fan | ...................... | A01K 1/0114 |
| 12,114,644 B2 * | 10/2024 | Holm | ..................... | H04N 23/57 |
| 2007/0056521 A1 * | 3/2007 | Caputa | .................. | A01K 1/011 119/166 |

(Continued)

FOREIGN PATENT DOCUMENTS

CN 115135145 A * 9/2022 ........... A01K 1/0114

OTHER PUBLICATIONS

Animal waste disposal apparatus and method (Year: 2022).*

*Primary Examiner* — Yvonne R Abbott-Lewis
(74) *Attorney, Agent, or Firm* — Olive Law Group, PLLC

(57) ABSTRACT

A semi-automatic feces shoveling cat litter box, comprises a shell, a cat litter bin, and a feces shoveling component. The shell is arranged on the outer periphery of the cat litter bin, and the middle part of the shell is provided with a first opening for cats to enter into the cat litter bin. One end of the shell is provided with a second opening for the cat litter bin to pass through. Under the action of external force, the shell and the cat litter bin move relatively to each other. The end of the cat litter bin away from the second opening is provided with a waste bin. The feces shoveling component is arranged on the end of the shell near the second opening. One end of the feces shoveling component is hinged to the shell, and another end is provided with a first dentate structure.

9 Claims, 15 Drawing Sheets

(56) References Cited

U.S. PATENT DOCUMENTS

| | | | |
|---|---|---|---|
| 2010/0095898 A1* | 4/2010 | Cook | A01K 1/0114 |
| | | | 119/166 |
| 2014/0069343 A1* | 3/2014 | Loveday | A01K 1/0132 |
| | | | 119/166 |
| 2015/0173323 A1* | 6/2015 | Plazarte | A01K 1/011 |
| | | | 119/166 |
| 2021/0251182 A1* | 8/2021 | Anderson | A01K 1/011 |
| 2023/0371465 A1* | 11/2023 | Kim | A01K 1/011 |
| 2024/0196855 A1* | 6/2024 | Graves | A01K 1/011 |

* cited by examiner

SEMI-AUTOMATIC FECES SHOVELING CAT LITTER BOX

CROSS-REFERENCE TO RELATED APPLICATIONS

The present application claims the benefit of Chinese Patent Application No. 202422260822.5 filed on Sep. 13, 2024, the contents of which are hereby incorporated by reference.

TECHNICAL FIELD

The present application relates to a technical field of pet products, in particular to a semi-automatic feces shoveling cat litter box.

BACKGROUND

A cat litter basin is an appliance designed specifically for cats to hold cat litter and collect cat solid waste. Some high-end cat litter boxes are equipped with a specially designed electric feces shoveling mechanism that can automatically scoop out solid waste or stir cat litter to separate urine clumps, saving a lot of time and labor for cleaning. However, the price of such a cat litter box is relatively high, and many cat owners prefer to choose a simple cat litter box with a lower cost.

The cleaning steps of a simple cat litter box include:
(1) Using a cat litter shovel to scoop out solidified cat feces and urine clumps from the litter box;
(2) Pouring the waste into a trash can or a special cat feces bag;
(3) Smoothing the cat litter to ensure that it is evenly spread in the box to avoid accumulation.

In order to maintain hygiene and reduce odor, it is better to clean the cat litter box every day. It can be seen that although the simple cat litter box is low in cost, it requires the owner to invest more time and energy in regular cleaning.

Therefore, it is desired to design a low-cost and easy-to-clean cat litter box that meets users' need.

SUMMARY

In order to overcome the deficiencies in the prior art, the present application provides a semi-automatic feces shoveling cat litter box, which has a low production cost and simple feces shoveling steps, thus saving the user's time in cleaning the cat litter box.

The technical solution adopted by the present application to solve the technical problems is:

A semi-automatic feces shoveling cat litter box, comprises a shell, a cat litter bin, and a feces shoveling component. The shell is arranged on the outer periphery of the cat litter bin, and the middle part of the shell is provided with a first opening for cats to enter into the cat litter bin. One end of the shell is provided with a second opening for the cat litter bin to pass through. Under the action of external force, the shell and the cat litter bin move relatively to each other. A waste bin is arranged on the end of the cat litter bin far away from the second opening. The feces shoveling component is arranged on the end of the shell near the second opening. One end of the feces shoveling component is hinged to the shell, and another end of the feces shoveling component is provided with a first dentate structure. The first dentate structure extends into the cat litter bin for removing cat feces in the cat litter bin.

Further, the shell is provided with a first guide rail on its side facing to the cat litter bin, and the cat litter bin is provided with a first pulley on its side facing to the shell, wherein the first pulley is provided in the first guide rail.

Further, the end of the cat litter bin away from the waste bin is set as the head end, and the end of the cat litter bin close to the waste bin is set as the tail end. Both sides of the bottom of the head end of the cat litter bin are provided with a second pulley, and the head end of the cat litter bin is provided with a scratching board extending towards the bottom of the cat litter bin. A gap is provided between the scratching board and the head end of the cat litter bin.

Further, the feces shoveling component includes a connection rack and a feces shoveling board, wherein the connection rack includes a first beam and active bars provided on both ends of the first beam, and the feces shoveling board is connected to the first beam. The first dentate structure is provided on the end of the feces shoveling board away from the first beam.

Further, the first beam is provided with a convex structure, and the feces shoveling board is provided with a concave trough, wherein the concave trough is adapted to the convex structure. A cavity is provided inside the first beam, and active humps are provided on the convex structure. The active humps move towards the direction of the cavity under the action of external force. Fixing holes are provided on one side of the concave trough of the feces shoveling board, and the fixing holes are adapted to the contour of the active humps.

Further, one end of the active bars is hinged to the shell, and another end of the active bars is provided with a third pulley. The side of the cat litter bin is provided with a second guide rail, and the third pulley is provided in the second guide rail and moves along the second guide rail.

Further, the second guide rail includes a first rail and a second rail. The tail end of the first rail is connected to the head end of the second rail, wherein the head end of the second rail is a character "几"-shaped structure, and the tail end of the second rail is set as a horizontal rail. The end of the cat litter bin close to the second rail is set as an arc-shaped structure extending upwards.

Further, the end of the arc-shaped structure close to the waste bin is provided with a second dentate structure, and the second dentate structure and the first dentate structure are staggered.

Further, an isolation section is provided in the middle part of the first rail, and the isolation section divides the first rail into a first aisle and a second aisle. The first aisle is located above the second aisle, wherein the head end of the first aisle is communicated with the head end of the second aisle, and the tail end of the first aisle is communicated with the tail end of the second aisle. The end of the isolation section close to the tail end of the first aisle is provided with a rotation shaft, and the rotation shaft is provided with a return bracket.

Further, a first beam and a second beam are provided on the tail end of the cat litter bin, wherein the first beam is located at the top of the cat litter bin, and the second beam is located at the bottom of the cat litter bin. The first beam is provided with a fastener, and a groove adapted to the fastener is provided on the top of the waste bin. A third opening for the waste bin to pass through is provided on the tail end of the cat litter bin.

The beneficial effects of the present application are as follows:

The present application provides a semi-automatic feces shoveling cat litter box. A user pulls the cat litter bin to make the feces shoveling component and the cat litter bin undergo relative displacement. The feces shoveling component shovels the cat feces in the cat litter bin to the waste bin to implement the shoveling work. After shoveling is completed, the user pushes the cat litter bin to its original position, and the feces shoveling component and the cat litter bin also return to their initial positions. The production cost of the cat litter box is low, and the steps of shoveling feces are simple. The user only needs to push and pull to implement the quick shoveling work, which saves the user's time in cleaning the cat litter box.

BRIEF DESCRIPTION OF DRAWINGS

To better illustrate the technical solutions of the embodiments of the present application or the technical solutions of the prior art, a brief introduction of the figures that need to be used in the description of embodiments or prior art will be given below. Obviously, the figures in the following description are only some embodiments of the present application. For those of ordinary skills in the art, other figures can also be obtained based on these figures without inventive efforts.

NOTE OF THE REFERENCE SIGNS 1-shell; 10-first opening; 11-litter blocking board; 110-first side; 111-second side; 112-third side; 113-litter sifter; 114-first buckle; 115-first slot; 116-second buckle; 117-second slot; 12-second opening; 13-first guide rail;

2-cat litter bin; 20-waste bin; 201-groove; 21-first pulley; 22-second pulley; 23-scratching board; 230-gap; 24-second guide rail; 240-first rail; 2401-isolation section; 2402-first aisle; 2403-second aisle; 2404-rotation shaft; 2405-return bracket; 241-second rail; 25-arc-shaped structure; 250-second dentate structure; 26-second beam; 27-third beam; 28-third opening;

3-feces shoveling component; 30-connection rack; 301-first beam; 302-convex structure; 303-active hump; 304-active bar; 305-third pulley; 31-feces shoveling board; 310-first dentate structure; 311-concave trough; 312-fixing hole

DESCRIPTION OF EMBODIMENTS

In order for those of skills in the art to better understand the purposes, features and effect of the present application, the following clearly and completely describes ideas, specific structures and the technical effects of the present application with reference to the drawings and the embodiments of the present application. Apparently, the described embodiments are merely some but not all of the embodiments of the present application. Based on the embodiments of the present application, all the other embodiments obtained by those of ordinary skills in the art without creative work are all within the scope of protection of the present application. In addition, all the "linkage/connection" relationship in the present application does not simply mean a direct contact of components, but a better-preferred linkage/connection structure according to specific implementation situations by adding or reducing linkage/connection auxiliary components. The various technical features in the present application can be combined interchangeably without conflicting with each other.

The present application provides a semi-automatic feces shoveling cat litter box with low production cost, simple feces shoveling steps, saving users' time in cleaning the cat litter box.

Embodiment 1

As shown in FIGS. 1 to 14, the embodiment provides a semi-automatic feces shoveling cat litter box, comprising a shell 1, a cat litter bin 2, and a feces shoveling component 3, wherein the shell 1 is arranged on the outer periphery of the cat litter bin 2.

Figure 1:
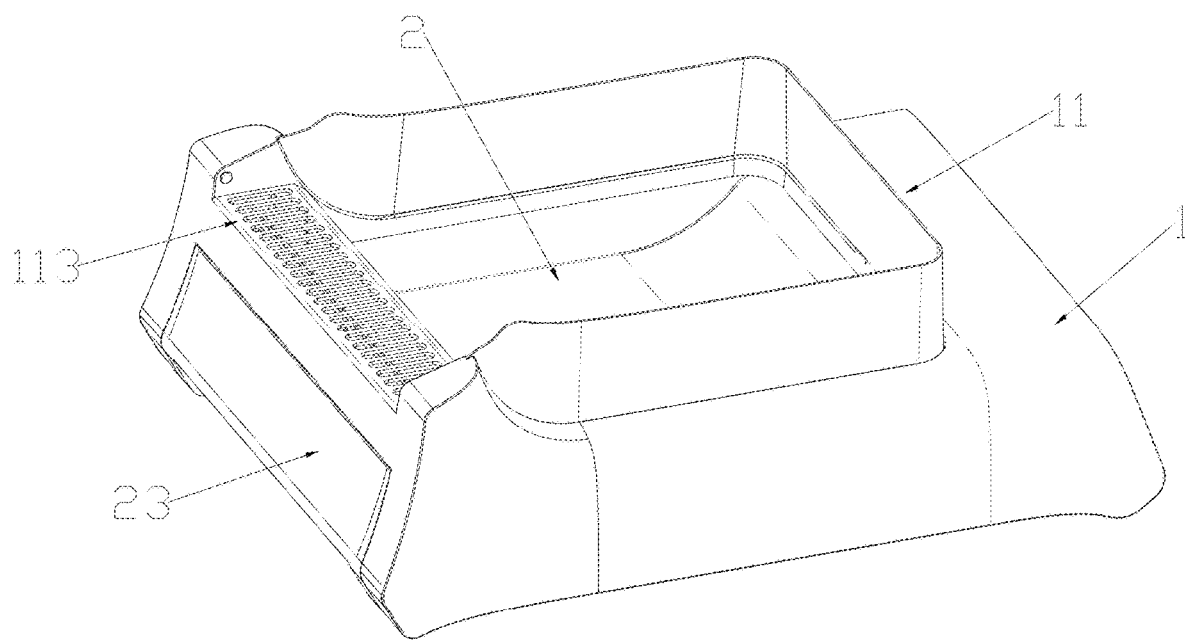
FIG. 1 is a schematic diagram (axial side) of the overall of the cat litter box of Embodiment 1 in the present application.
Figure 2:
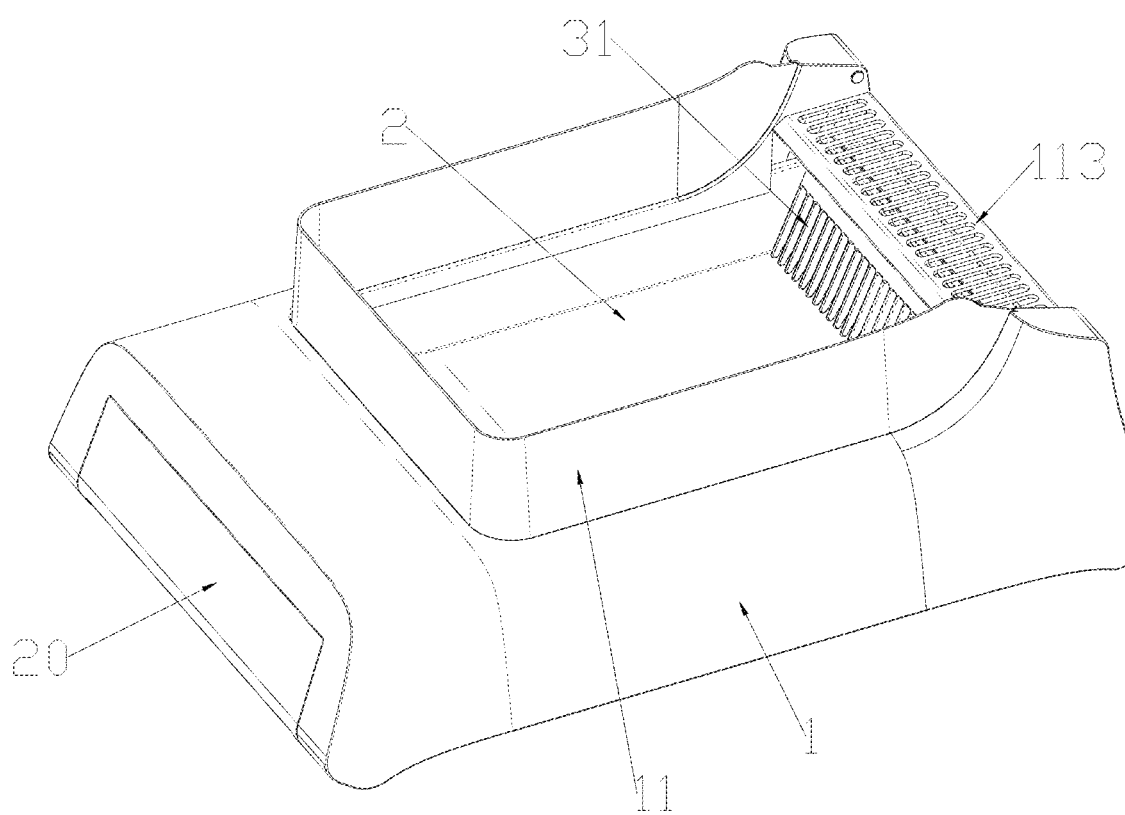
FIG. 2 is a schematic diagram from another angle (axial side) of the cat litter box of Embodiment 1 in the present application.
Figure 8:
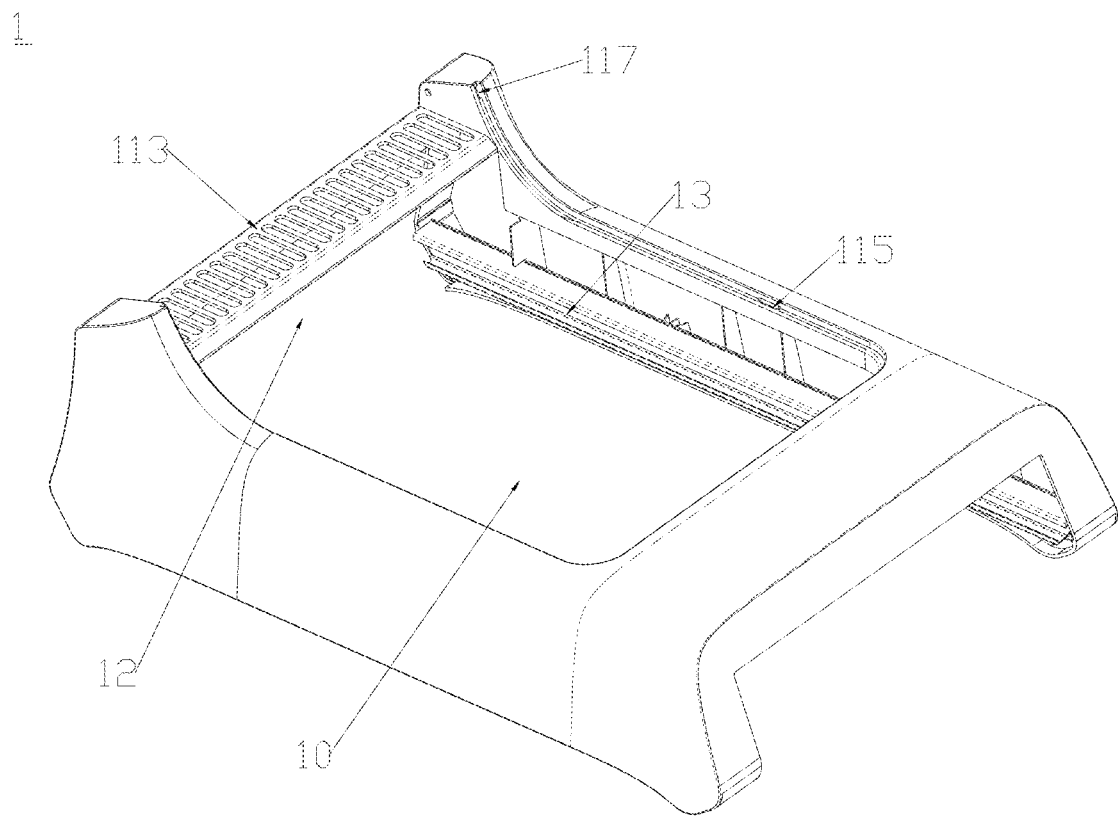
FIG. 8 is a schematic diagram of the shell of the cat litter box of Embodiment 1 in the present application.

As shown in FIGS. 1, 2 and 8, the middle part of the shell 1 is provided with a first opening 10 for cats to enter into the cat litter bin 2, and one end of the shell 1 is provided with a second opening 12 for the cat litter bin 2 to pass through. Under the action of external force, the shell 1 and the cat litter bin 2 move relatively to each other.

Figure 4:
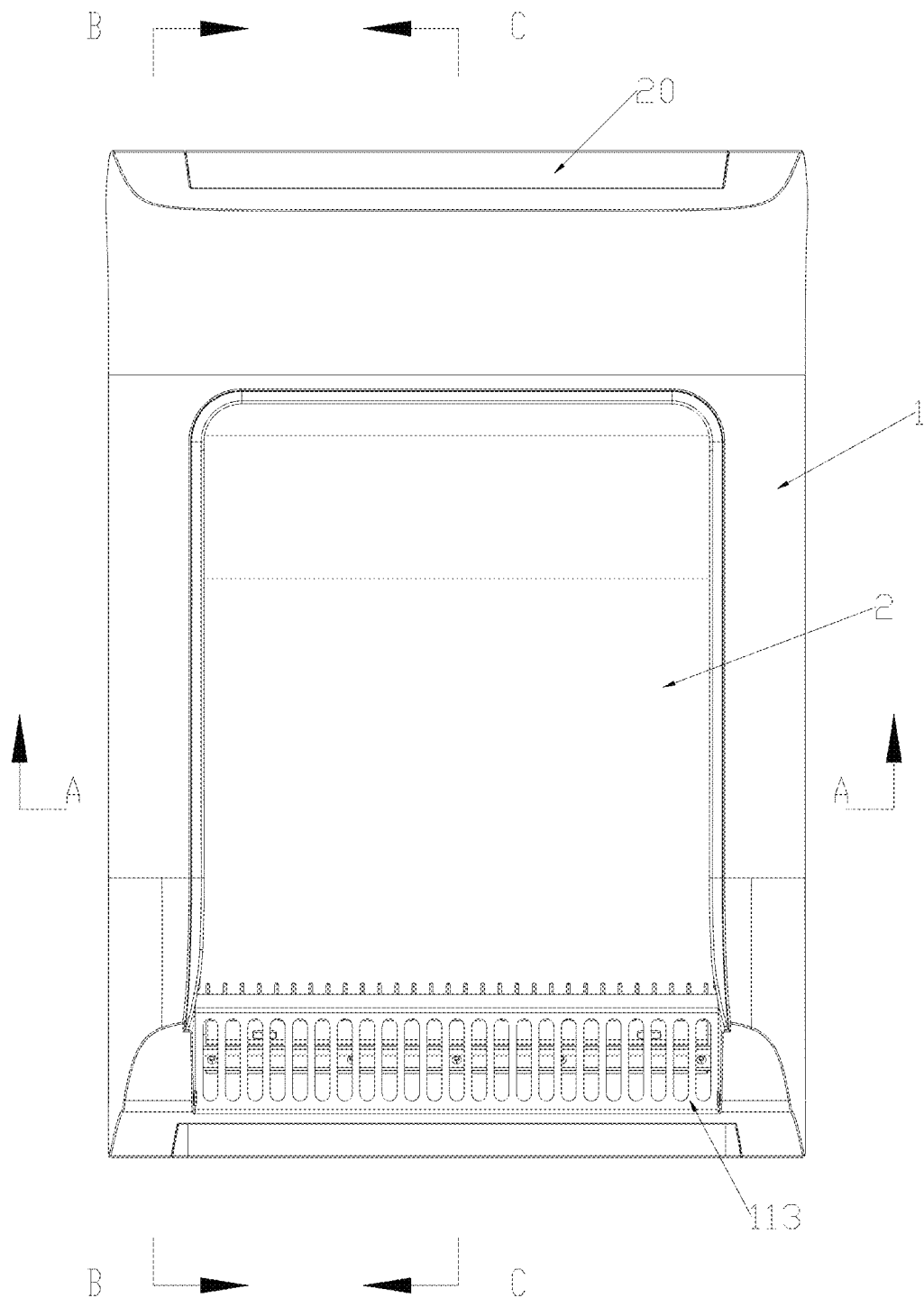
FIG. 4 is a schematic diagram (top view) of the cat litter box of Embodiment 1 in the present application.
Figure 5:
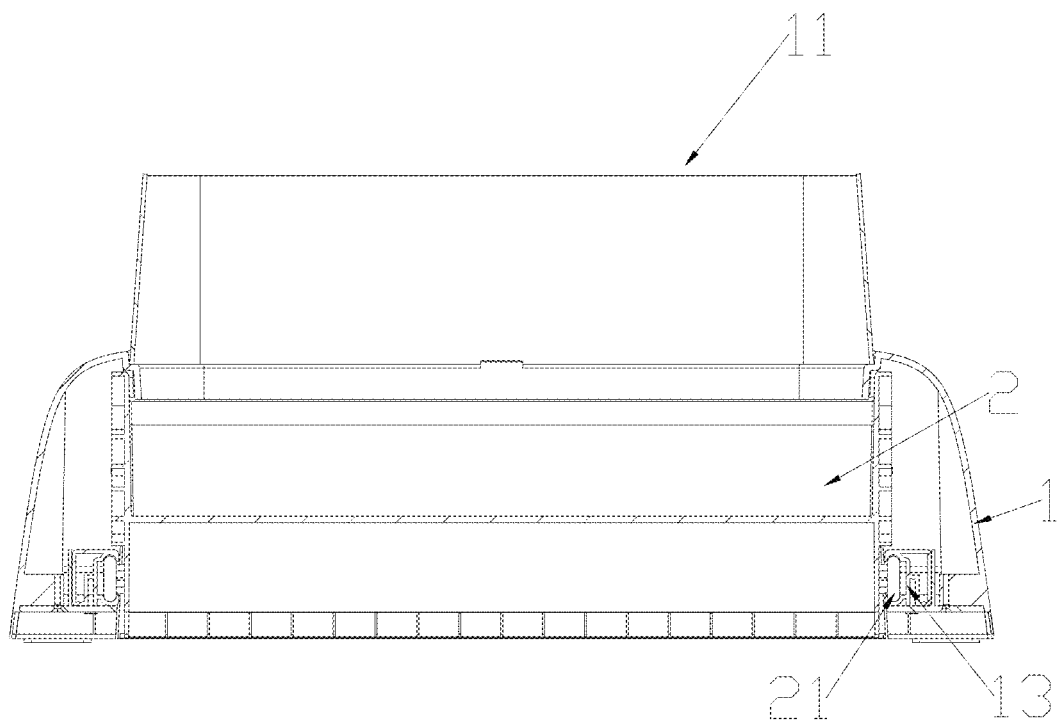
FIG. 5 is a cross-sectional view taken along line A-A in FIG. 4.
Figure 6:
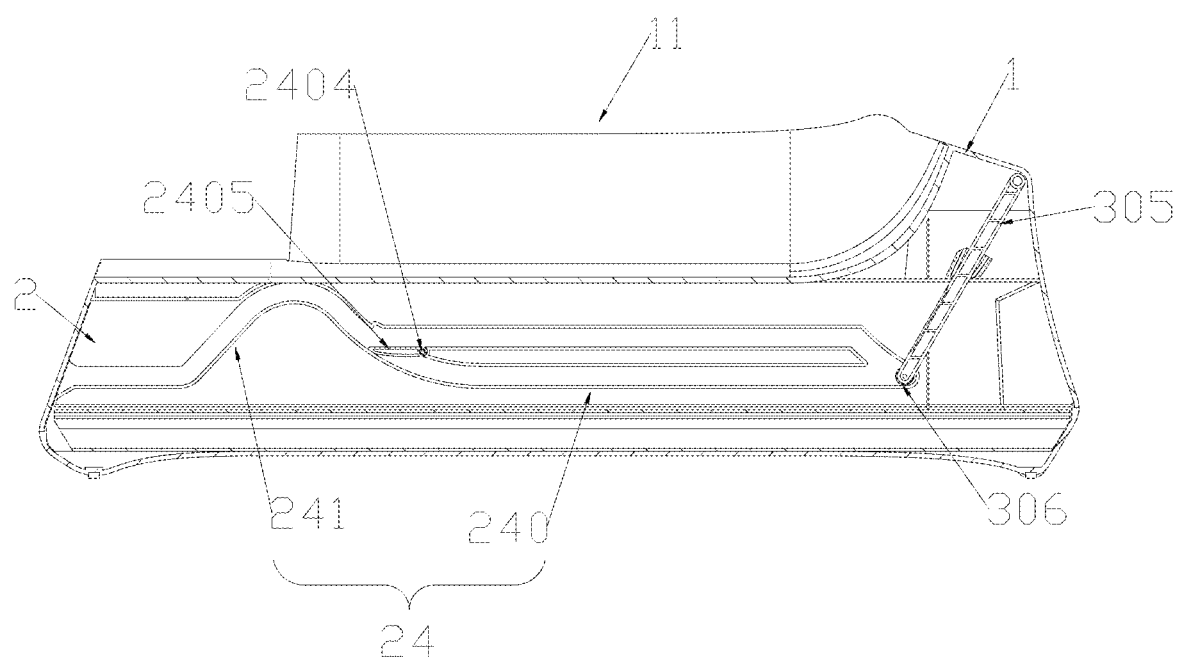
FIG. 6 is a cross-sectional view taken along line B-B in FIG. 4.
Figure 7:
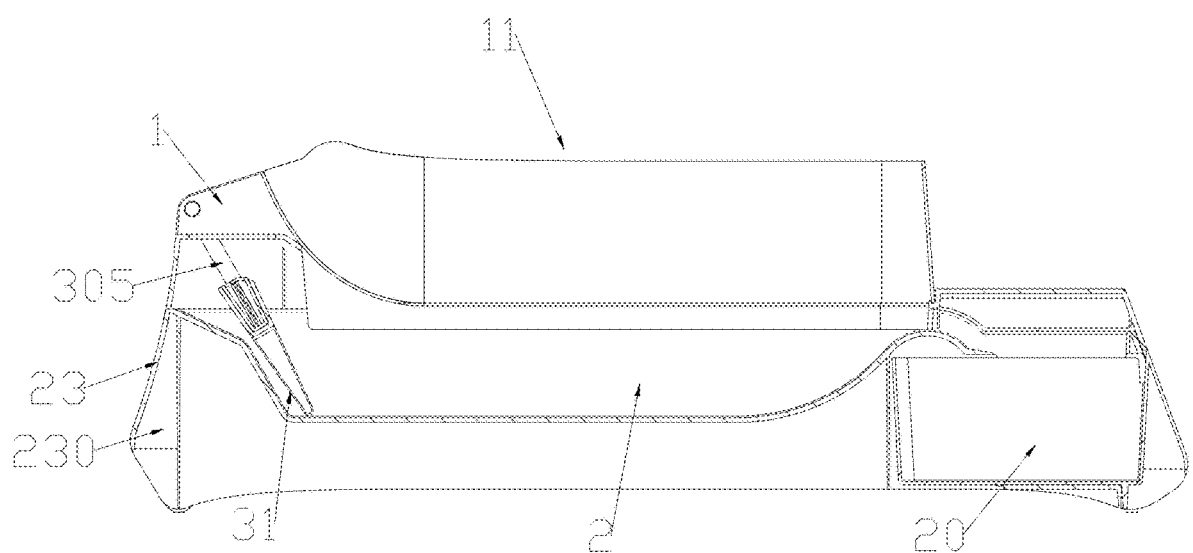
FIG. 7 is a cross-sectional view taken along line C-C in FIG. 4.

As shown in FIGS. 1, 4 and 7, in this embodiment, the end of the cat litter bin 2 away from the second opening 12 is provided with a waste bin 20, and the feces shoveling component 3 is provided on one end of the shell 1 near the second opening 12.

Figure 11:
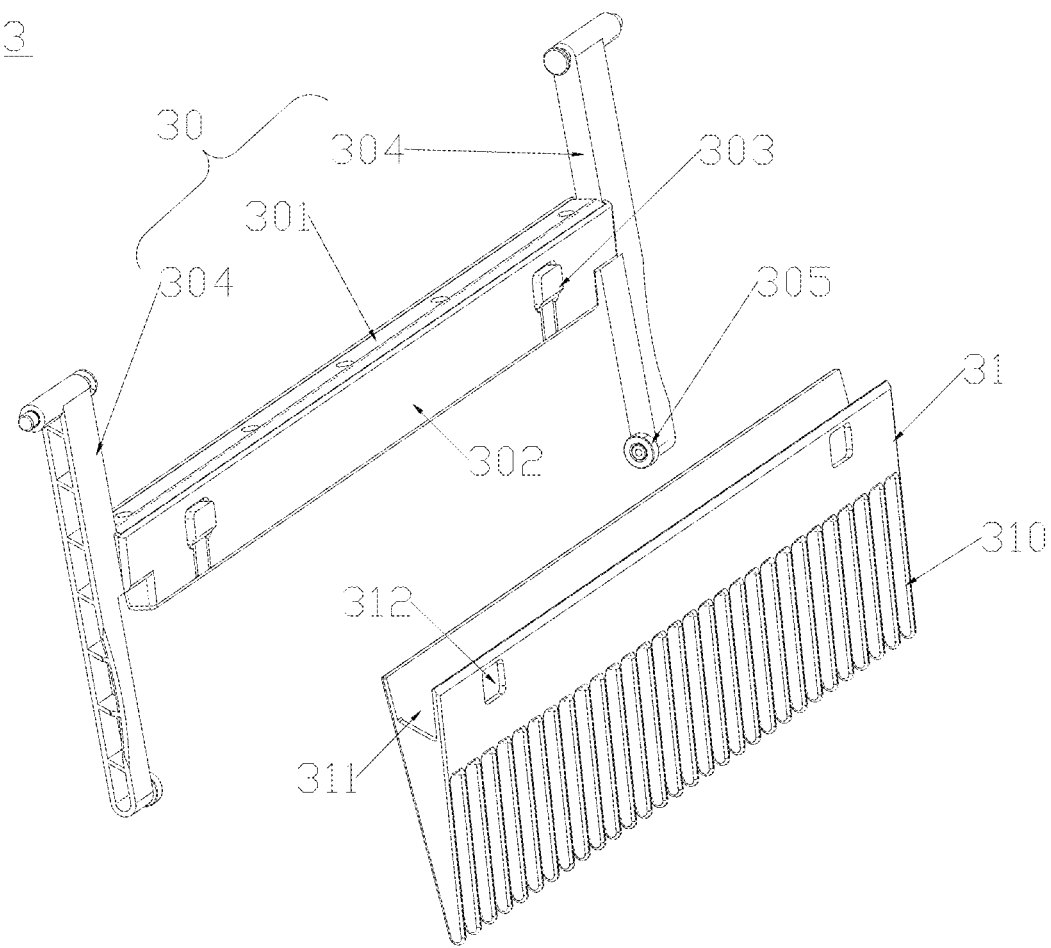
FIG. 11 is a schematic diagram of the feces shoveling component of the cat litter box of Embodiment 1 in the present application.

As shown in FIGS. 1, 2 and 11, furthermore, one end of the feces shoveling component 3 is hinged to the shell 1, and another end of the feces shoveling component 3 is provided with a first dentate structure 310, which extends into the cat litter bin 2 for removing waste in the cat litter bin 2. It should be noted that the spacing between adjacent racks of the first dentate structure 310 is smaller than the average size of cat feces, which prevents cat feces from passing through the first dentate structure 310 to ensure that the feces shoveling component 3 removes cat feces completely.

For the convenience of description, the end of the cat litter bin 2 away from the waste bin 20 is set as the head end, and the end of the cat litter bin 2 close to the waste bin 20 is set as the tail end. The usage method of the semi-automatic feces shoveling cat litter box provided in this embodiment is:

When it is necessary to shovel feces, the user grasps the head end of the cat litter bin 2 and pulls it out along the second opening 12, causing relative movement between the cat litter bin 2 and the shell 1. Using the cat litter bin 2 as a reference object, the feces shoveling component 3 moves together with the shell 1. Specifically, the feces shoveling component 3 moves from the head end of the cat litter bin 2 to the tail end of the cat litter bin 2, and finally enters the waste bin 20. During the movement, the first dentate structure 310 shovels cat feces in the cat litter bin 2 to the waste bin 20, implementing the work of shoveling feces.

After the feces shoveling is completed, the user pushes the cat litter bin 2 along the second opening 12 to the inner periphery of the shell 1. The shell 1 and the cat litter bin 2 undergo relative displacement. Using the cat litter bin 2 as a reference object, the feces shoveling component 3 moves together with the shell 1 along the waste bin 20 to the head end of the cat litter bin 2. The first dentate structure 310 smooths the cat litter during movement to avoid accumulation of cat litter at the tail end of the cat litter bin 2.

Compared with the manually feces shoveling cat litter boxes on the market, the cat litter box provided in this embodiment has simple feces shoveling steps by only a push and a pull to realize the feces shoveling function, saving users' time for feces shoveling. Compared with the fully-automatic cat litter boxes on the market, the cat litter box provided in this embodiment does not require an electrical control component and thus control the production costs. Consumers can purchase the cat litter box provided in this embodiment at a relatively low price. In summary, the cat litter box provided in this embodiment not only has the convenient function of shoveling feces, but also has the advantage of low price, which contributes to strong market competitiveness.

Figure 12:
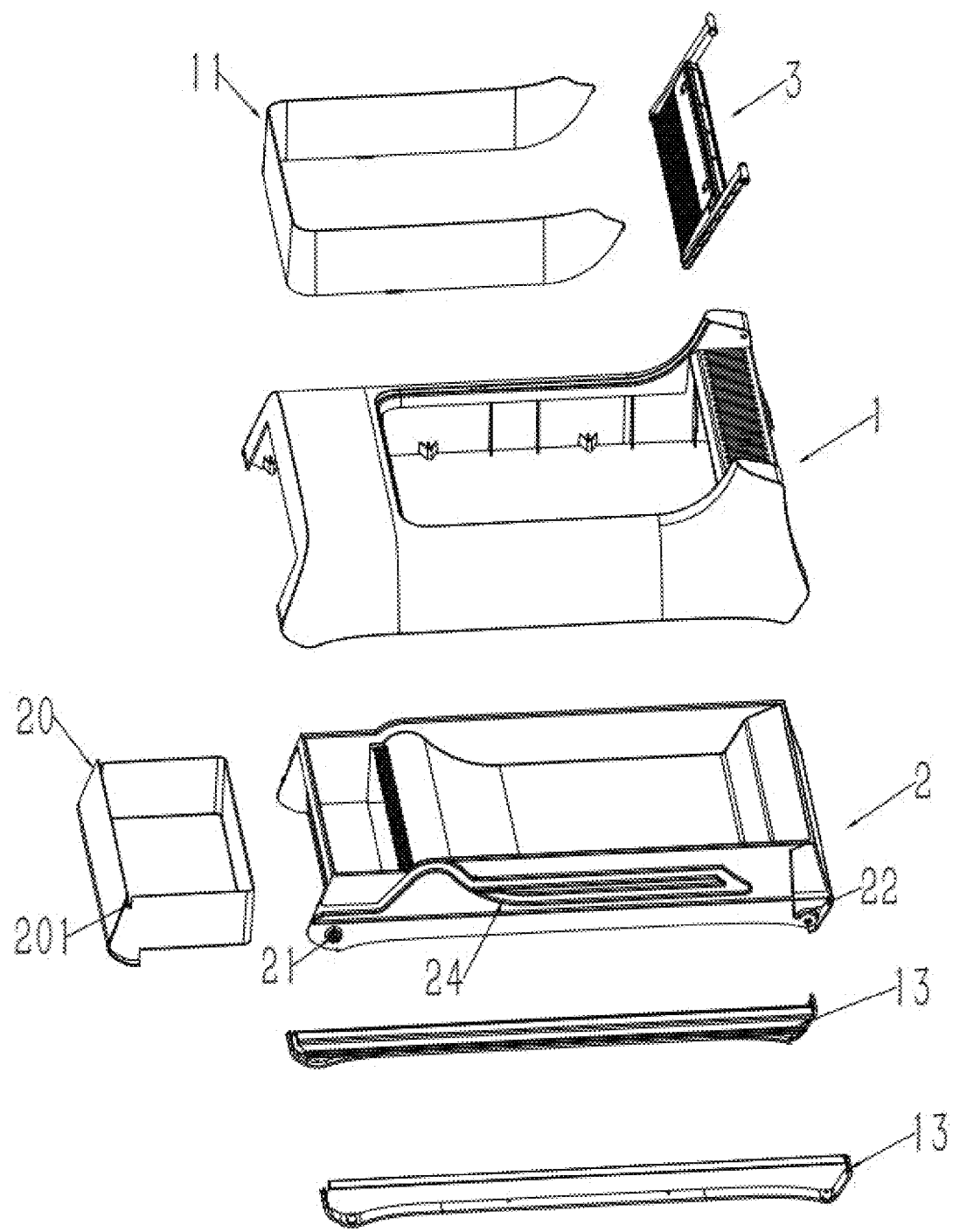
FIG. 12 is an explosive diagram of the cat litter box of Embodiment 1 in the present application.

As shown in FIG. 12, in this embodiment, the shell 1 is provided with a first guide rail 13 facing to the side of the cat litter bin 2, and the cat litter bin 2 is provided with a first pulley 21 facing to the side of the shell 1, which is provided in the first guide rail 13. The first guide rail 13 is a horizontally arranged linear guide rail. When the user pulls the cat litter bin 2 to move, the first pulley 21 moves along the first guide rail 13. This embodiment provides guidance for the movement of the cat litter bin 2 by setting the first guide rail 13 and the first pulley 21.

Figure 3:
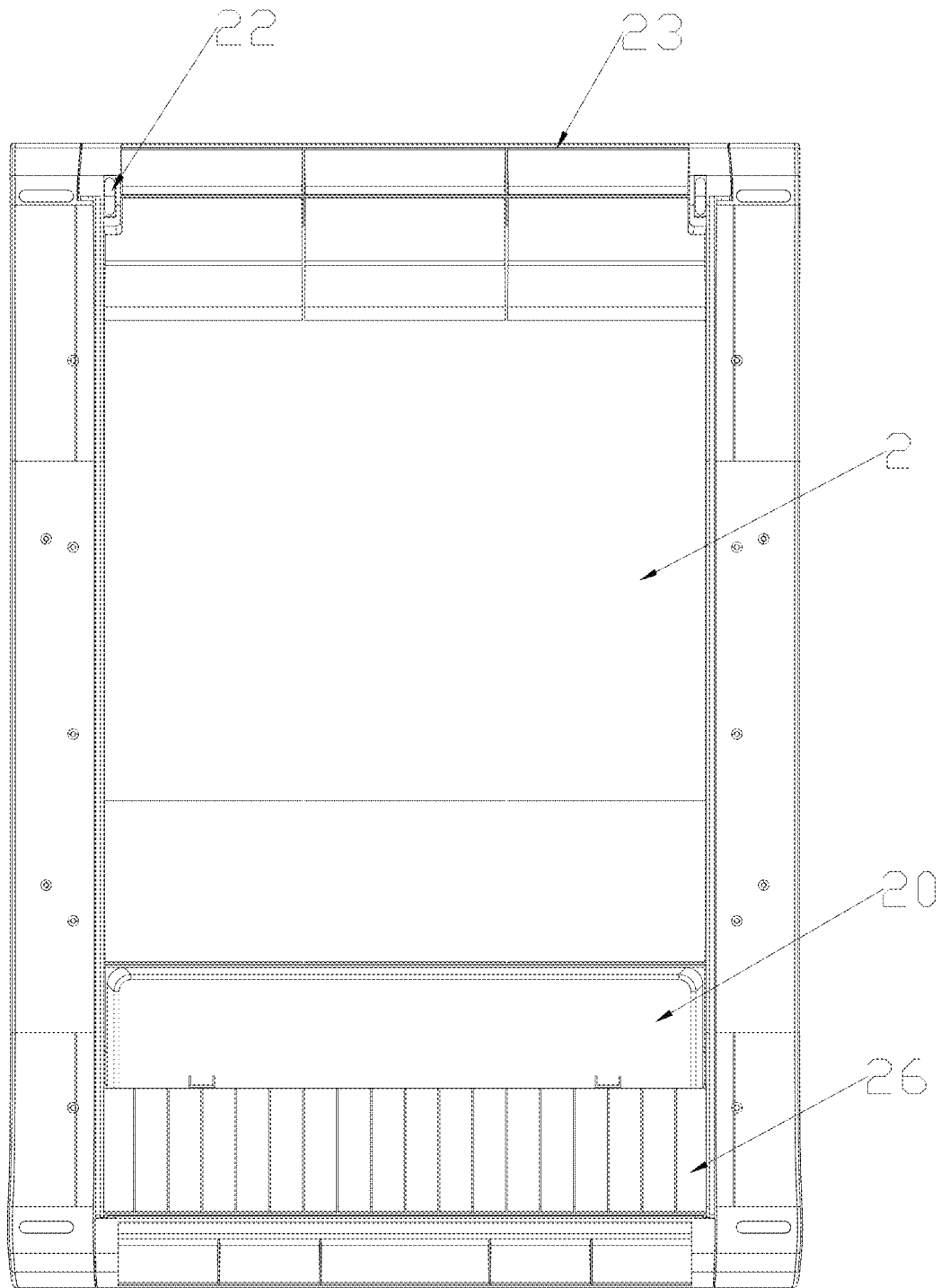
FIG. 3 is a schematic diagram (bottom view) of the cat litter box of Embodiment 1 in the present application.

As shown in FIG. 3, a second pulley 22 is provided on both sides of the bottom of the head end of the cat litter bin 2. The cat litter box in this embodiment is placed on the ground for use. When the user pulls the cat litter bin 2 to move, the second pulley 22 generates a small rolling friction with the ground. Combined with the aforementioned small rolling friction generated between the cat litter bin 2 and the shell 1 by the first pulley 21, even the cat litter bin 2 is fully filled with cat litter, the user only needs to use a small amount of force to pull the cat litter bin 2 to move.

As shown in FIGS. 3, 4, and 7, the head end of the cat litter bin 2 is provided with a scratching board 23 extending towards the bottom of the cat litter bin 2. There is a gap 230 between the scratching board 23 and the head end of the cat litter bin 2, which provides sufficient griping space for the user. The user can stretch his hand into the gap 230, grip the scratching board 23, and then pull the cat litter bin 2.

As shown in FIG. 11, the feces shoveling component 3 includes a connection rack 30 and a feces shoveling board 31. In this embodiment, the feces shoveling board 31 is made of plastic material, which has a relatively lower cost compared to other materials. The surface of the plastic is smooth, easy to wipe and clear, which is helpful in maintaining the hygiene of the feces shoveling board 31. In another specific implementation, the feces shoveling board 31 is made of a composition of plastic and metal. Compared with using only plastic materials, the composition of plastic and metal provides higher durability and wear-resistance, extending the service life of the feces shoveling board 31.

In this embodiment, the connection rack 30 is made of a composition of acrylonitrile-butadiene-styrene copolymer resin (ABS resin) and 30% glass fiber. Due to the good processing performance of ABS resin, it still maintains the characteristics of easy molding and processing when combined with glass fiber. At the same time, the ABS resin reinforced by the glass fiber provides a smoother and more beautiful appearance, making the connection rack 30 look more high-end. In another specific implementation, the connection rack 30 is made of composite metal or directly made of aluminum alloy by die-casting, which has higher strength and durability.

The connection rack 30 includes a first beam 301 and active bars 304 arranged on both ends of the first beam 301. The feces shoveling board 31 is connected to the first beam 301, and the first dentate structure 310 is arranged on one end of the feces shoveling board 31 away from the first beam 301.

The first beam 301 is provided with a convex structure 302, and the feces shoveling board 31 is provided with a concave trough 311, which is adapted to the convex structure 302. The first beam 301 has a cavity (not shown in the figures) inside, and the convex structure 302 is provided with active humps 303, wherein the active humps 302 move towards the direction of the cavity. One side of the concave trough 311 of the feces shoveling board 31 is provided with fixing holes 312, which are adapted to the contour of the active humps 303.

The assembly process of the feces shoveling component 3 is: using the side wall of the concave trough 311 to press the active humps 303 to move towards the direction of the cavity; inserting the convex structure 302 into the concave trough 311; after insertion, the active humps 303 penetrate through the fixing holes 312; the feces shoveling board 31 is fixed on the connection rack 30. The present application configures the feces shoveling component 3 as an assembly type, which facilitates users to disassemble the feces shoveling board 31 for cleaning.

In this embodiment, the feces shoveling component 3 is set as a symmetrical structure. Taking the active bar 304 on one side of the feces shoveling board 31 as an example for explanation, one end of the active bar 304 is hinged to the shell 1, and another end of the active bar 304 is provided with a third pulley 305. The side of the cat litter bin 2 is provided with a second guide rail 24, and the third pulley 305 is arranged in the second guide rail 24 and moves along the second guide rail 24.

It should be specifically noted that in this embodiment, the first pulley 21, the second pulley 22, and the third pulley 305 all use rubber wheels. Compared with metal wheels, rubber wheels produce less noise during rolling, providing a relatively quiet and comfortable environment for cats. In addition, rubber wheels have strong wear-resistance and can maintain good working conditions for a long time.

As shown in FIGS. 4, 6, 10 and 12, the second guide rail 24 includes a first rail 240 and a second rail 241. The tail end of the first rail 240 is connected to the head end of the second rail 241, wherein the head end of the second rail 241 is a character "⌐"-shaped structure. The tail end of the second rail 241 is a horizontal rail. The end of the cat litter bin 2 near the second rail 241 is an arc-shaped structure 25 extending upwards.

Figure 13:
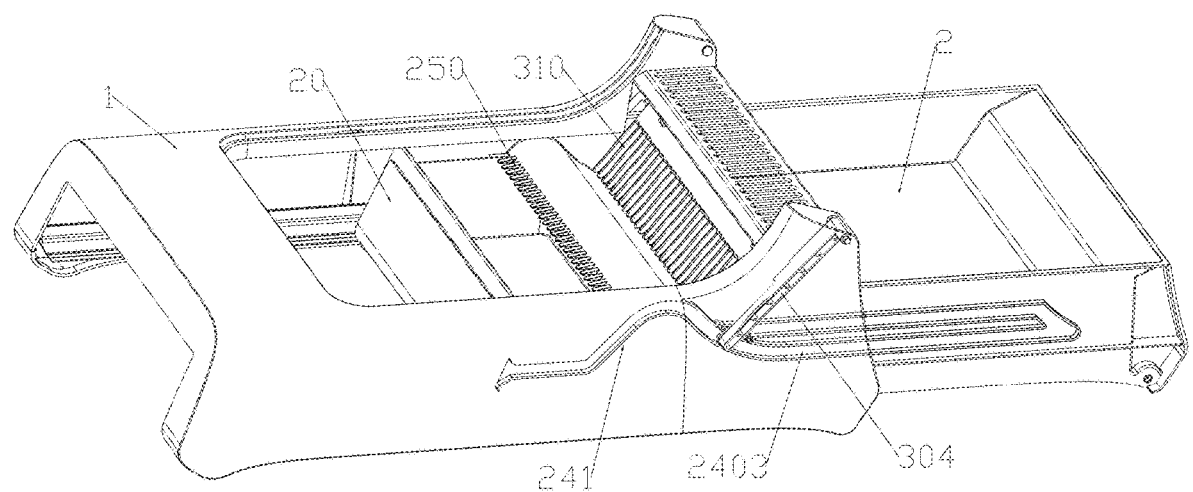
FIG. 13 is a schematic diagram of the cat litter box of Embodiment 1 in the present application in a pulled state.

As shown in FIG. 13, the end of the arc-shaped structure 25 close to the waste bin 20 is provided with a second dentate structure 250, and the second dentate structure 250 and the first dentate structure 310 are staggered. When the feces shoveling board 31 moves to the end of the arc-shaped structure 25, the second dentate structure 250 extends into the gap 230 between adjacent racks of the first dentate structure 310 to clean the residual cat feces on the first dentate structure 310.

Figure 10:
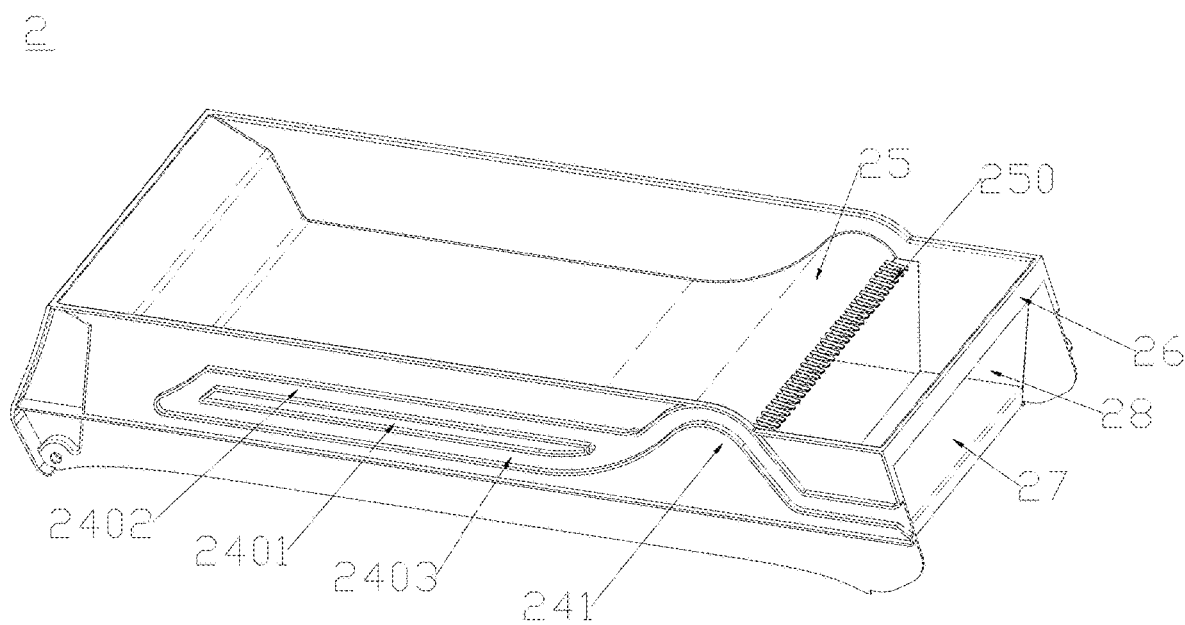
FIG. 10 is a schematic diagram of the cat litter bin of the cat litter box of Embodiment 1 in the present application.

As shown in FIG. 10, in this embodiment, an isolation section 2401 is provided in the middle part of the first rail 240, which divides the first rail 240 into a first aisle 2402 and a second aisle 2403. The first aisle 2402 is located above the second aisle 2403, and the first aisle 2402 is approximately parallel to the second aisle 2403. The head end of the first aisle 2402 is communicated with the head end of the second aisle 2403, and the tail end of the first aisle 2402 is communicated with the tail end of the second aisle 2403. A rotation shaft 2404 is provided on the end of the isolation section 2401 near the tail end of the first aisle 2402. There is a return bracket 2405 on the rotation shaft 2404.

In this embodiment, the first aisle 2402 is approximately parallel to the second aisle 2403, and the head end of the first aisle 2402 is connected to the head end of the second aisle 2403 through a linear chute. The tail end of the first aisle 2402 is connected to the tail end of the second aisle 2403 through an arc-shaped chute. The head end of the second aisle 2403 is closer to the head end of the cat litter bin 2, and the linear chute extends towards the direction of the head end of the cat litter bin 2.

In the absence of external force, the return bracket 2405 abuts against the side wall of the arc-shaped chute and is in a horizontal state, so that the first aisle 2402 is communicated with the second rail 241; Under the action of external force, the return bracket 2405 rotates upward with the rotation shaft 2404 being the center, enabling the second aisle 2403 to communicate with the second rail 241.

In the initial state, the shell 1 covers the cat litter bin 2, and the third pulley 305 in the feces shoveling component 3 is located at the head end of the second aisle 2403 under the action of gravity.

As shown in FIG. 13, when the user pulls the cat litter bin 2 to move horizontally along the first guide rail 13, using the cat litter bin 2 as a reference object, the third pulley 305 moves along the second aisle 2403. At the same time, the feces shoveling board 31 shovels the cat feces in the cat litter bin 2 and moves towards the direction of the waste bin 20. When the third pulley 305 moves to the arc-shaped chute, the return bracket 2405 is pushed upwards, so that the second aisle 2403 is communicated with the second rail 241. The third pulley 305 continues to move from the head end to the tail end of the second rail 241, and shovels the cat feces to the waste bin 20.

Figure 14:
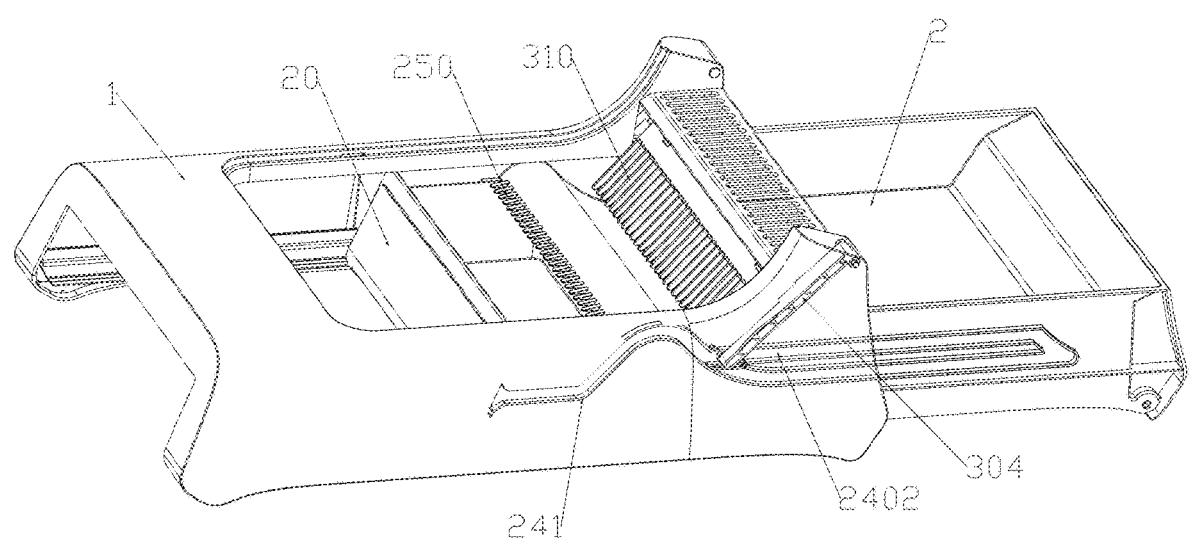
FIG. 14 is a schematic diagram of the cat litter box of Embodiment 1 in the present application in a pushed-back state.

As shown in FIG. 14, after the cat feces shoveling is completed, the user pushes the cat litter bin 2 back to its initial state. The third pulley 305 moves along the tail end of the second rail 241 to the head end of the second rail 241. At this time, the return bracket 2405 returns to a horizontal position under the action of gravity. The third pulley 305 enters into the second aisle 2403 along the top of the return bracket 2405 and continues to move to the head end of the second aisle 2403. Due to the communication between the head end of the second aisle 2403 and the head end of the first aisle 2402 through a linear chute, under the action of gravity, the feces shoveling component 3 slides into the head end of the second aisle 2403 along the linear chute.

It can be understood that, using the cat litter bin 2 as a reference object, when pulling the cat litter bin 2, the feces shoveling component 3 moves along the second aisle 2403 located below, and most of the first dentate structure 310 of the feces shoveling board 31 extends into the cat litter bin 2 to remove cat feces buried in the cat litter bin 2; when pushing the cat litter bin 2 to its original position, the feces shoveling component 3 moves along the first aisle 2402 located above, and only a small part of the first dentate structure 310 of the feces shoveling board 31 extends into the cat litter bin 2 to smooth the cat litter on the surface in the cat litter bin 2.

In another specific implementation, the first rail 240 is a horizontal guide rail, and the tail end of the horizontal guide rail is connected to the head end of the second rail 241. The first rail 240 and the tail end of the second rail 241 are approximately at the same height. During the process of pulling the cat litter bin 2, the third pulley 305 at the bottom of the feces shoveling component 3 moves along the head end of the first rail 240 to the tail end of the second rail 241; when pushing the cat litter bin 2 to its original position, the third pulley 305 at the bottom of the feces shoveling component 3 moves along the tail end of the second rail 241 to the head end of the first rail 240.

As shown in FIGS. 10 and 12, in this embodiment, the tail end of the cat litter bin 2 is provided with a second beam 26 and a third beam 27. The second beam 26 is located at the top of the cat litter bin 2, and the third beam 27 is located at the bottom of the cat litter bin 2. The second beam 26 is provided with a fastener (not shown in the figures), and the top of the waste bin 20 is provided with a groove 201 adapted to the fastener. The tail end of the cat litter bin 2 is provided with a third opening 28. The waste bin 20 is inserted between the second beam 26 and the third beam 27 along the third opening 28. The third beam 27 is supported at the bottom of the waste bin 20, and the fastener is clamped with the groove 201 tightly to fix the waste bin 20 at the tail end of the cat litter bin 2.

When using the cat litter box provided by the present application, users can directly collect cat feces in the waste bin 20. After the waste bin 20 is fully filled, users can take out the waste bin 20 from the tail end of the cat litter bin 2 and clean the waste bin 20; users can also put a garbage bag into the waste bin 20 and collect cat feces into the garbage bag. After the garbage bag is full, users can take it out and dispose of it.

Further, a sealing gasket (not shown in the figures) is provided on the side of the shell 1 facing to the waste bin 20. When the shell 1 covers the cat litter bin 2 and the waste bin 20, the sealing gasket isolates the waste bin 20 from the external environment, avoiding the leakage of odors inside the waste bin 20 to the external environment. In another implementation, the sealing gasket is provided on one side of the waste bin 20 facing to the shell 1.

Figure 9:
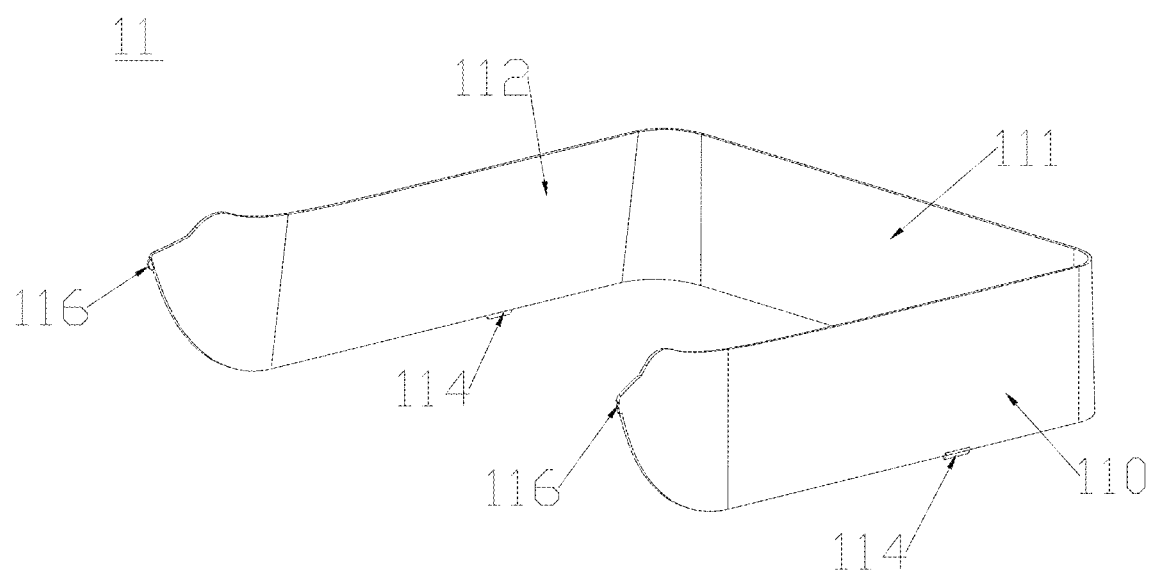
FIG. 9 is a schematic diagram of the litter blocking board of the cat litter box of Embodiment 1 in the present application.

As shown in FIGS. 1, 9 and 10, in this embodiment, an integrally-formed litter blocking board 11 is provided at the first opening 10 of the shell 1. The litter blocking board 11 includes a first side 110, a second side 111, and a third side 112 connected in sequence. For ease of description, the end of the shell 1 arranged with the feces shoveling component 3 is taken as the front side of the first opening 10. A litter sifter 113 is provided on the front side of the first opening 10. The first side 110 is connected to the left side of the first opening 10, and the second side 111 is connected to the rear side of the first opening 10, and the third side 112 is connected to the right side of the first opening 10.

Specifically, the bottom of the first side 110 and the third side 112 is respectively provided with a first buckle 114, and the end of the first side 110 and the third side 112 is respectively provided with a second buckle 116. The left and right sides of the first opening 10 are provided with a first slot 115 corresponding to the first buckle 114, and the front side of the first opening 10 is provided with a second slot 117 corresponding to the second opening 12. The litter blocking board 11 is connected to the shell 1 by fitting the first buckle 114 with the first slot 115, and fitting the second buckle 116 with the second slot 117. When a cat enters into the cat litter bin 2 through the first opening 10 and moves inside the cat litter bin 2, it may cause the cat litter inside the cat litter bin 2 to splash. The litter blocking board 11 prevents the cat litter from splashing in three directions of the first opening 10, while the litter sifter 113 on the front side flushes the splashed cat litter into the cat litter bin 2 to avoid waste.

Further, users can customize transparent or semi-transparent litter blocking board 11 according to their personal needs. Transparent litter blocking board 11 does not obstruct the users' sight, enabling the users to observe conveniently the situations inside the cat litter bin from multiple angles, while semi-transparent litter blocking board 11 provides cats with a relatively concealed environment, making them feel safer and more comfortable.

Embodiment 2

Figure 15:
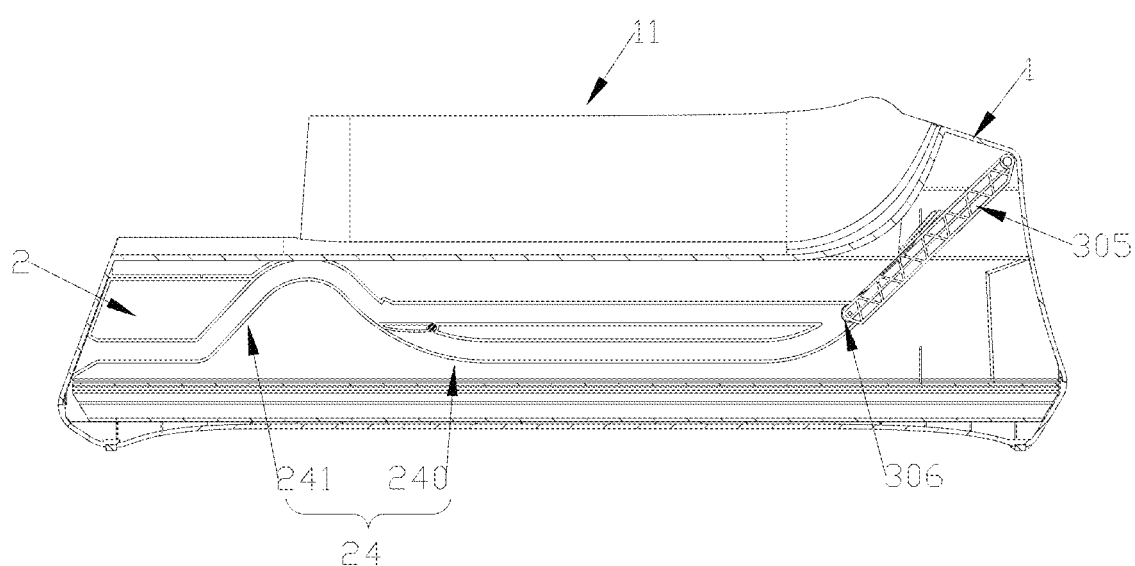
FIG. 15 is a partial cross-sectional schematic diagram of the cat litter box of Embodiment 2 in the present application.

As shown in FIG. 15, the difference between this embodiment and Embodiment 1 is that the head end of the first aisle 2402 is communicated with the head end of the second aisle 2403 through an arc-shaped chute. The head end of the first aisle 2402 is closer to the head end of the cat litter bin 2, and the arc-shaped chute extends towards the middle part of the cat litter bin 2.

In Embodiment 1, after the feces shoveling is completed, the user pushes the cat litter bin 2 back to its original position, and at this time, the feces shoveling component 3 and the cat litter bin 2 return to their initial positions. Under the action of gravity, the feces shoveling component 3 should have slid into the head end of the second aisle 2403.

However, when the feces shoveling component 3 moves from the tail end of the cat litter bin 2 towards the head end of the cat litter bin 2, it may cause some cat litter to move together. The closer the area is to the head end of the cat litter bin 2, the more likely it is for the cat litter to accumulate. The accumulated cat litter creates resistance to the feces shoveling component 3. If the resistance is too high, the feces shoveling component 3 fails to slide smoothly into the head end of the second aisle 2403. If the user pulls the cat litter bin 2 in this situation, the feces shoveling component 3 is not able to slide normally along the second aisle 2403, which affects the smooth progress of the feces shoveling work.

In view of this, in this embodiment, the arc-shaped chute is designed to extend towards the middle part of the cat litter bin 2. The closer it is to the middle part of the cat litter bin 2, the smoother the distribution of cat litter is, and less resistance is generated by the cat litter to the feces shoveling component 3. In this way, the feces shoveling component 3 slides smoothly into the head end of the second aisle 2403, getting fully prepared for the next shoveling.

It can be understood that technical personnel in this field can combine various implementation methods in the above embodiments under the guidance of the above embodiments, and obtain technical solutions for multiple implementation methods.

The above description is only the preferred embodiments of the present application and is not intended to limit the present application. Any modifications, equivalent substitutions, and improvements made within the spirit and principles of the present application should be included in the scope of protection of the present application.

The invention claimed is:

1. A semi-automatic feces shoveling cat litter box, comprises a shell, a cat litter bin, and a feces shoveling component, wherein the shell is arranged on the outer periphery of the cat litter bin, and the middle part of the shell is provided with a first opening for cats to enter into the cat litter bin; one end of the shell is provided with a second opening for the cat litter bin to pass through; under the action of external force, the shell and the cat litter bin move relatively to each other; one end of the cat litter bin away from the second opening is provided with a waste bin; the feces shoveling component is arranged on one end of the shell near the second opening; one end of the feces shoveling component is hinged to the shell, and another end of the feces shoveling component is provided with a first dentate structure; the first dentate structure extends into the cat litter bin and is used for removing cat feces in the cat litter bin; the feces shoveling component further includes a connection rack and a feces shoveling board; the connection rack includes a first beam and active bars provided on both ends of the first beam; the feces shoveling board is connected to the first beam, and the first dentate structure is provided on one end of the feces shoveling board away from the first beam.

2. The semi-automatic feces shoveling cat litter box according to claim 1, wherein the shell is provided with a first guide rail on its side facing to the cat litter bin, and the cat litter bin is provided with a first pulley on its side facing to the shell, wherein the first pulley is provided in the first guide rail.

3. The semi-automatic feces shoveling cat litter box according to claim 1, wherein the end of the cat litter bin away from the waste bin is set as the head end, and the end of the cat litter bin close to the waste bin is set as the tail end; both sides of the bottom of the head end of the cat litter bin is provided with a second pulley; the head end of the cat litter bin is provided with a scratching board extending towards the bottom of the cat litter bin, and a gap is provided between the scratching board and the head end of the cat litter bin.

4. The semi-automatic feces shoveling cat litter box according to claim 1, wherein the first beam is provided with a convex structure, and the feces shoveling board is provided with a concave trough; the concave trough is adapted to the convex structure; a cavity is provided inside the first beam, and active humps are provided on the convex structure; the active humps move towards the direction of the cavity under the action of external force, and fixing holes are provided on one side of the concave trough of the feces shoveling board, wherein the fixing holes are adapted to the contour of the active humps.

5. The semi-automatic feces shoveling cat litter box according to claim 1, wherein one end of the active bars is hinged to the shell, and another end of the active bars is provided with a third pulley; the side of the cat litter bin is provided with a second guide rail, and the third pulley is provided in the second guide rail and moves along the second guide rail.

6. The semi-automatic feces shoveling cat litter box according to claim 5, wherein the second guide rail includes a first rail and a second rail; the tail end of the first rail is connected to the head end of the second rail, and the head end of the second rail is a character "⌐⌐"-shaped structure; the tail end of the second rail is a horizontal rail, and the end of the cat litter bin close to the second rail is an arc-shaped structure extending upwards.

7. The semi-automatic feces shoveling cat litter box according to claim 6, wherein the end of the arc-shaped structure close to the waste bin is provided with a second dentate structure, and the second dentate structure and the first dentate structure are staggered.

8. The semi-automatic feces shoveling cat litter box according to claim 6, wherein an isolation section is provided in the middle part of the first rail, and the isolation section divides the first rail into a first aisle and a second aisle; the first aisle is located above the second aisle; the head end of the first aisle is communicated with the head end of the second aisle, and the tail end of the first aisle is communicated with the tail end of the second aisle; the end of the isolation section close to the tail end of the first aisle is provided with a rotation shaft, and the rotation shaft is provided with a return bracket.

9. The semi-automatic feces shoveling cat litter box according to claim 1, wherein a first beam and a second beam are provided on a tail end of the cat litter bin; the first beam is located at the top of the cat litter bin, and the second beam is located at the bottom of the cat litter bin; the first beam is provided with a fastener, and a groove adapted to the fastener is provided at the top of the waste bin; a third opening for the waste bin to pass through is provided on the tail end of the cat litter bin.

* * * * *